United States Patent [19]

Lii et al.

[11] Patent Number: 5,114,980
[45] Date of Patent: May 19, 1992

[54] POLYURETHANE INTEGRAL SKIN FOAM OF LOW OZONE DEPLETION POTENTIAL

[75] Inventors: Lucky J. Lii; Shi-Shiow Chen, both of Hsin-chu, Taiwan

[73] Assignee: Industrial Technology Research Institute, Hsinchu, Taiwan

[21] Appl. No.: 702,998

[22] Filed: May 20, 1991

[51] Int. Cl.$^5$ ............................ B29D 9/00; C08J 9/34
[52] U.S. Cl. .................................... 521/51; 264/45.5; 264/DIG. 14; 521/118; 521/122; 521/127; 521/129; 521/131
[58] Field of Search ................. 264/45.5; 521/51, 118, 521/122, 127, 129, 131

[56] References Cited

U.S. PATENT DOCUMENTS

| | | | |
|---|---|---|---|
| 3,694,530 | 9/1972 | Wolfe | 521/51 |
| 4,065,410 | 12/1977 | Schafer et al. | 521/51 |
| 4,150,206 | 4/1979 | Jourquin et al. | 521/51 |
| 4,483,974 | 11/1984 | Grogler et al. | 521/51 |
| 4,576,970 | 3/1986 | Ganster et al. | 521/51 |
| 4,783,296 | 11/1988 | Fischer et al. | 264/45.5 |
| 4,927,863 | 5/1990 | Bartlett et al. | 521/131 |

OTHER PUBLICATIONS

M. J. Cartmell, "Developments in the Use of CFCs in Polyurethane Foams," DATE, European Isocyanate Producers Association (ISOPA), Avenue Louise, 250 Bte. 52, 1050 Brussells, Belgium, pp. 180–197.

J. A. Creazzo & P. L. Bartlett, "The DuPont Program on Alternative Blowing Agents for Polyurethane Foams—Recent Developments," Polyurethanes 88, Proceedings of the SPI—31st Annual Technical/Marketing Conference, Oct. 18-21, 1988, Philadelphia, PA, pp. 58–68.

K. T. Dishart & J. A. Creazzo, "The DuPont Program on Fluorocarbon Alternative Blowing Agents for Polyurethane Foams," Polyurethanes World Congress 1987–50 Years of Polyurethanes, Proceedings of the FSK/SPI, Sep. 29–Oct. 2, 1987, p. 57.

E. E. Kennedy, C. Y. Lin & D. Bhattacharjee, "Evaluations of HCFC-123 and HCFC-141b as Potential Blowing Agents for Polyurethane/Polyisocyanurate Rigid Foam Laminate Insulation," Polyurethanes 88, Proceedings of the SPI—31st Annual Technical/Marketing Conference, Oct. 18-21, 1988, Philadelphia, PA, pp. 6–11.

K. W. Dietrich & H. P. Doerge, "Performance of Alternative Chlorofluorocarbons in Rigid Urethane Appliance Foams," Polyurethanes 88, Proceedings of the SPI—31st Annual Technical/Marketing Conference, Oct. 18-21, 1988, Philadelphia, PA, pp. 17–23.

L. B. Weisfeld, "Formulating Away from CFCs Part II: Alternates and Solutions," Plastics Compounding, May/Jun. 1988, pp. 40–43.

*Primary Examiner*—Morton Foelak
*Attorney, Agent, or Firm*—Darby & Darby

[57] ABSTRACT

A process for preparing polyurethane integral skin foam with low ozone depletion potential, which comprises mixing 100 pph of a polyether polyol, 5–50 pph of a chain extender, 0.1–2.0 pph of a surfactant, 0.01–0.20 pph of an amine and 0.01–0.20 pph of an organotin catalyst, 0–3.0 pph of a nucleating agent and 1.0–30 pph of a blowing agent comprising 50 to 100 weight percent of HCFC-123 and 50 to 0 weight percent of HCFC-141b to form a polyol mixture; blending said polyol mixture with isocyanate having an ISO index=0.95 to 1.10 and reacting said blend at a temperature from 0°–70° C. in a mold at a temperature of from 10° to 90° C. for a molding time of 1 to 9 minutes to form a polyurethane integral skin foam, and the product of said process.

11 Claims, No Drawings

POLYURETHANE INTEGRAL SKIN FOAM OF LOW OZONE DEPLETION POTENTIAL

BACKGROUND OF THE INVENTION

The traditional process of producing polyurethane (PU) integral skin foam comprises using CFC-11 as the blowing agent to yield products used in automobile parts and sporting goods, such as instrument panels, head and hand rests, bumpers, rims, handles and seats for motorcycles.

The production of PU integral skin foam is a one-step process in contrast to the old process where a PVC synthetic leather cover was applied to the PU foam. Because of the smooth surface given by the PVC cover in the old process, the appearance and physical properties of the skin in the one-step process remains a very important feature. Traditional chemical blowing agents, such as water, used in PU foaming cannot completely or partially replace physical blowing agents, such as CFC-11, for integral skin foam because serious skin defect problems occur in the production. Unfortunately, CFC-11 and fully halogenated chlorofluorocarbons (CFCs) deplete the ozone layer and their continued use has been severely limited.

Accordingly, it is desirable to provide a commercially feasible, low ozone depletion potential product, using pollution free technique for the production of a PU integral skin foam which has physical properties comparable to the current commercial products.

SUMMARY OF THE INVENTION

In accordance with the invention, it has been discovered that a polyurethane (PU) integral skin foam having physical properties comparable to that of the current commercial products and low ozone depletion potential (ODP) can be obtained by using the two-carbon hydrogen-containing halocarbon, such as HCFC-123 or HCFC-141b. These materials have an ODP of 0.05 compared to CFC-11 which has an ODP of 1. To accomplish this result, compounding of polyurethane and the processing conditions must be carefully controlled. This result is particularly surprising since, as noted in M. J. Cartmell, "Developments in the Use of CFCs in Polyurethane Foams," (European Isocyanate Producers Association (ISOPA), 250 Avenue Louise, Bte. 52, 1050 Brussels, Belgium), it was widely recognized that CFC-11 was a key element in all integral skin foams because the latter condenses at the mold surface during the molding operation to produce the "self skinning" foam (pages 186, 192–193). Also U.S. Pat. No. 4,927,863, noted that HCFCs cause undesirable shrinkage in closed-cell PU foams.

DETAILED DESCRIPTION OF THE INVENTION

While the use of HCFCs as replacements for CFCs has been widely studied since the ozone depletion effect of CFCs has been noted, the successful replacement of the blowing agents in integral skin PU foams has been elusive. In accordance with the instant invention, applicants have found that HCFCs may be used, though they dissolve PU to a greater extent than CFC-11. To accomplish this end, it is necessary to use selected polyether polyols in combination with selected chain extenders so as to develop a formulation which resists the dissolution of the HCFC blowing agents. As will be understood by those skilled in the art, a system wherein the blowing agent dissolves the polyurethane cannot form a practical product, especially where the product is a fine cell foam having this blowing agent entrained therein.

In addition to the foregoing, it has been found that only selected catalyst systems can be used in combination with the HCFC blowing agents to form the desired products. Particularly preferred are amine and organotin catalysts which, though well known in the art, are but a few of the many catalysts used in the preparation of polyurethanes.

Additional constituents are surfactants to produce an end product with a fine skin and nucleating agents to make the integral skin PU foam cells uniform and delicate.

Surprisingly, when the appropriate balance of components is used along with appropriately selected mold and material temperatures and molding times, products which are comparable to those currently in use may be obtained. Advantageously, these processing conditions are similar to those currently in use. Naturally, the ability to use such processing conditions with the novel formulation of the invention is a marked advantage for the foam producer, since no new processing equipment is necessary in order to achieve the benefits of the instant invention. The markedly different physical properties of CFC-11 as compared to the HCFCs used in the instant invention are shown in the following table.

TABLE A

| | CFC-11 | HCFC-123 | HCFC-141b |
|---|---|---|---|
| Molecular formula | $CCl_3F$ | $CHCl_2CF_3$ | $CH_3CFCl_2$ |
| Molecular weight | 137.4 | 152.9 | 116.9 |
| Boiling point (°C.) | 23.8 | 28 | 32 |
| Heat conductivity of gas (BTU/(hr)(ft)(°F.) | 0.0045 @ 25° C. | 0.0054 @ 30° C. | 0.0053 @ 32° C. |
| Heat of evaporation cal/g | 43.1 | 40 | 53 |
| Life in atmosphere (years) | 60 | 2 | 5 |
| Relative ozone depletion potential | 1 | <0.05 | <0.05 |
| Relative greenhouse effect | 0.4 | <0.1 | <0.1 |

Not only do these materials have divergent boiling points, heat conductivities and heats of evaporation but they also have markedly different effects on the atmosphere. It will be noted that CFC-11 remains in the atmosphere 12–30 times longer than HCFCs and that the latters, relative ozone depletion potential is some 20 times better.

Essential to the success of the formulation of the instant invention is the use of a polyether polyol which, it has been found, prevents the dissolution of the polyurethane in the HCFCs.

Other compounding ingredients are chain extenders, surfactants, amine-type and organotin-type catalysts and nucleating agents. Chain extenders include ethylene glycol, propylene glycol, 1,4 butylene glycol, and diethylene glycol. The surfactant is preferably of silicone glycol type. The amine catalyst includes dimethylethanol amine (DMEA), triethylene amine (TEA) and triethylene diamine (DABCO). Suitable tin catalyst include dibutyl tin dilaurate (DBTDL) and stannous octoate. A preferred nucleating agent is SiO, powder having a particle size $\leq 30m\mu$. The liquid diisocyanate is diisocyanate diphenyl methane (MDI)

The formulations of the invention are broadly described in the following table:

TABLE B

| | |
|---|---|
| Polyether polyol, pph* | 100 |
| Chain extender, pph | 0-150 |
| Surfactant, pph | 0.1-2.0 |
| Amine catalyst, pph | 0.01-0.20 |
| Tin catalyst, pph | 0.01-0.20 |
| Blowing agent, pph | 1.0-30 |
| Nucleating agent, pph | 0-3.0 |
| Liquid Isocyanate | ISO index = 0.95-1.1 |

*pph = parts per hundred of polyol

The process of the instant invention may be described as follows:

The polyether polyol, chain extender, surfactant and nucleating agent are metered in suitable proportions into a vessel stirred at high speed for 10 minutes. The necessary amine and organotin catalysts are added to the mixture and stirred vigorously for another 5 minutes while maintaining the temperature of the mixture at 20° C. The blowing agent (kept at 10° C) is rapidly added thereafter and stirred at high speed for another 5 minutes. The blend formed is referred to hereafter as the polyol mixture.

The polyol mixture and the liquid diisocyanate diphenyl methane are stored in separate storage tanks. To form the foam, the liquids are metered, with separate metering pumps, and mixed in suitable proportion in a mixing head to form a homogeneous blend. The blend is injected into an aluminum alloy mold (20 cm × 20 cm × 4 cm) which is maintained at a selected mold temperature. The upper mold plate is closed and the blend is permitted to react, foam and cure for the predetermined molding time. Finally, the mold is opened and the product removed.

A broad range of processing conditions may be used. These and the preferred ranges are shown in Table C.

TABLE C

| | Broad Range | Preferred Range |
|---|---|---|
| Mold temperature, °C. | 10-90 | 40-60 |
| Material temperature, °C. | 0-70 | 20-50 |
| Molding time, min. | 1-9 | 3-7 |

To illustrate the invention, examples using HCFC-123 and/or HCFC-141b as blowing agent are compared with traditional polyurethane integral skin foam using CFC-11 as the blowing agent.

In the examples the polyether polyol was obtained from Chiunglong Enterprise Corp., Ltd.; the MDI from ICI; the surfactant is Dow Corning DC-5043 and the nucleating agent is SiO, Japan Silica, VN-3.

EXAMPLE 1

Integral skin PU foams using 10 pph of blowing agent were prepared using the following formulations:

TABLE 1

| | Traditional method | | The Instant Invention | |
|---|---|---|---|---|
| Polyether polyol | 100 | 100 | 100 | 100 |
| MDI (ISO index = 1.05) | 57.53 | 57.53 | 60.07 | 65.14 |
| Ethylene glycol | 9.50 | 9.50 | 10.0 | 11.0 |
| Triethylene diamine | 0.1 | 0.1 | 0.1 | 0.1 |
| Dibutyltin dilaurate | 0.1 | 0.15 | 0.2 | 0.25 |
| Surfactant | 0.5 | 1.0 | 1.5 | 2.0 |
| Nucleating Agent | — | 0.5 | 0.8 | 1.0 |
| CFC-11 | 10 | — | — | — |
| HCFC-123 | — | 10 | 7 | 5 |
| HCFC-141b | — | 0 | 3 | 5 |

The physical properties of the skin are shown in the following table:

TABLE 2

| Phys. Properties | Test Method | Traditional Method | The instant invention | | |
|---|---|---|---|---|---|
| Density (g/cm$^3$) | ASTM792 | 0.902 | 0.899 | 0.908 | 0.915 |
| Tensile strength (kg/cm$^2$) | ASTM412 | 25.6 | 31.1 | 25.3 | 24.2 |
| Elongation (%) | ASTM412 | 110 | 100 | 100 | 110 |
| Tear strength (kg/cm) | ASTM624 | 12.0 | 10.5 | 12.5 | 11.6 |
| Hardness (Shore A) | ASTM2240 | 62 | 66 | 61 | 61 |

The physical properties of the foam are shown in Table 3 below:

TABLE 3

| Phys. Properties | Test Method | Traditional Method | The instant invention | | |
|---|---|---|---|---|---|
| Density (g/cm$^3$) | ASTM3574 | 0.225 | 0.239 | 0.227 | 0.228 |
| Tensile strength (kg/cm$^2$) | ASTM412 | 7.9 | 8.6 | 7.8 | 7.5 |
| Elongation (%) | ASTM412 | 110 | 110 | 110 | 100 |
| Tear strength (kg/cm) | ASTM624 | 2.2 | 2.0 | 2.1 | 2.2 |
| Hardness (Shore A) | ASTM2240 | 18 | 20 | 18 | 18 |

EXAMPLE 2

Integral skin PU foams using 20 pph of blowing agent were prepared using the following formulations:

TABLE 4

| | Traditional method | | The Instant Invention | |
|---|---|---|---|---|
| Polyether polyol | 100 | 100 | 100 | 100 |
| MDI (ISO index = 1.05) | 48.64 | 48.64 | 50.72 | 54.85 |
| Propylene glycol | 9.50 | 9.50 | 10.0 | 11.0 |
| Triethylene amine | 0.1 | 0.1 | 0.1 | 0.1 |
| Stannous octoate | 0.1 | 0.15 | 0.2 | 0.25 |
| Surfactant | 0.5 | 1.0 | 1.5 | 2.0 |
| Nucleating Agent | — | 0.5 | 0.8 | 1.0 |
| CFC-11 | 20 | — | — | — |
| HCFC-123 | — | 20 | 14 | 10 |
| HCFC-141b | — | 0 | 6 | 10 |

The physical properties of the skin are shown in the following table:

TABLE 5

| Phys. Properties | Test Method | Traditional Method | The instant invention | | |
|---|---|---|---|---|---|
| Density (g/cm$^3$) | ASTM792 | 0.895 | 0.860 | 0.897 | 0.895 |
| Tensile strength (kg/cm$^2$) | ASTM412 | 21.5 | 20.1 | 21.3 | 20.8 |
| Elongation (%) | ASTM412 | 110 | 125 | 110 | 100 |
| Tear strength (kg/cm) | ASTM624 | 7.3 | 7.8 | 7.2 | 6.9 |
| Hardness (Shore A) | ASTM2240 | 62 | 64 | 64 | 65 |

The physical properties of the foam are shown in Table 6 below:

TABLE 6

| Phys. Properties | Test Method | Traditional Method | The instant invention | | |
|---|---|---|---|---|---|
| Density (g/cm$^3$) | ASTM3574 | 0.178 | 0.187 | 0.180 | 0.182 |
| Tensile strength (kg/cm$^2$) | ASTM412 | 7.5 | 7.7 | 7.0 | 6.9 |
| Elongation (%) | ASTM412 | 120 | 120 | 120 | 100 |

TABLE 6-continued

| Phys. Properties | Test Method | Traditional Method | | The instant invention | |
|---|---|---|---|---|---|
| Tear strength (kg/cm) | ASTM624 | 2.2 | 2.0 | 1.8 | 2.1 |
| Hardness (Shore A) | ASTM2240 | 12 | 14 | 11 | 11 |

EXAMPLE 3

Integral skin PU foams using 5 pph of blowing agent were prepared using the following formulations:

TABLE 7

| | Traditional method | The Instant Invention | | |
|---|---|---|---|---|
| Polyether polyol | 100 | 100 | 100 | 100 |
| MDI (ISO Index = 1.05) | 42.51 | 42.51 | 44.26 | 47.75 |
| 1,4 Butylene glycol | 9.50 | 9.50 | 10.0 | 11.0 |
| Dimethyl ethanol amine | 0.1 | 0.1 | 0.1 | 0.1 |
| Dibutyltin dilaurate | 0.1 | 0.15 | 0.2 | 0.25 |
| Surfactant | 0.5 | 1.0 | 1.5 | 2.0 |
| Nucleating Agent | — | 0.5 | 0.8 | 1.0 |
| CFC-11 | 5 | — | — | — |
| HCFC-123 | — | 5 | 3.5 | 2.5 |
| HCFC-141b | — | 0 | 1.5 | 2.5 |

The physical properties of the skin are shown in the following table:

TABLE 8

| Phys. Properties | Test Method | Traditional Method | The instant invention | | |
|---|---|---|---|---|---|
| Density (g/cm$^3$) | ASTM792 | 0.945 | 0.955 | 0.955 | 0.962 |
| Tensile strength (kg/cm$^2$) | ASTM412 | 41.5 | 40.4 | 40.2 | 39.8 |
| Elongation (%) | ASTM412 | 120 | 100 | 120 | 120 |
| Tear strength (kg/cm) | ASTM624 | 11.5 | 12.0 | 11.6 | 11.7 |
| Hardness (Shore A) | ASTM2240 | 80 | 78 | 80 | 81 |

The physical properties of the foam are shown in Table 9 below:

TABLE 9

| Phys. Properties | Test Method | Traditional Method | The instant invention | | |
|---|---|---|---|---|---|
| Density (g/cm$^3$) | ASTM3574 | 0.332 | 0.341 | 0.335 | 0.328 |
| Tensile strength (kg/cm$^2$) | ASTM412 | 15.5 | 16 | 15.2 | 15.3 |
| Elongation (%) | ASTM412 | 100 | 100 | 100 | 100 |
| Tear strength (kg/cm) | ASTM624 | 2.7 | 2.9 | 2.5 | 2.7 |
| Hardness (Shore A) | ASTM2240 | 30 | 29 | 28 | 29 |

EXAMPLE 4

Integral skin PU foams using 30 pph of blowing agent were prepared using the following formulations:

TABLE 10

| | Traditional method | The Instant Invention | | |
|---|---|---|---|---|
| Polyether polyol | 100 | 100 | 100 | 100 |
| MDI (ISO Index = 1.05) | 37.49 | 37.49 | 38.98 | 41.95 |
| diethylene glycol | 9.50 | 9.50 | 10.0 | 11.0 |
| Triethylene diamine | 0.1 | 0.1 | 0.1 | 0.1 |
| Stannous octoate | 0.1 | 0.15 | 0.2 | 0.25 |
| Surfactant | 0.5 | 1.0 | 1.5 | 2.0 |
| Nucleating agent | — | 0.5 | 0.8 | 1.0 |
| CFC-11 | 30 | — | — | — |
| HCFC-123 | — | 30 | 21 | 15 |

TABLE 10-continued

| | Traditional method | The Instant Invention | | |
|---|---|---|---|---|
| HCFC-141b | — | 0 | 9 | 15 |

The physical properties of the skin are shown in the following table:

TABLE 11

| Phys. Properties | Test Method | Traditional Method | The instant invention | | |
|---|---|---|---|---|---|
| Density (g/cm$^3$) | ASTM792 | 0.772 | 0.765 | 0.785 | 0.780 |
| Tensile strength (kg/cm$^2$) | ASTM412 | 16.5 | 17.5 | 16.3 | 15.8 |
| Elongation (%) | ASTM412 | 100 | 90 | 100 | 100 |
| Tear strength (kg/cm) | ASTM624 | 6.3 | 6.1 | 6.5 | 6.3 |
| Hardness (Shore A) | ASTM2240 | 50 | 51 | 50 | 51 |

The physical properties of the foam are shown in Table 12 below:

TABLE 12

| Phys. Properties | Test Method | Traditional Method | The instant invention | | |
|---|---|---|---|---|---|
| Density (g/cm$^3$) | ASTM3574 | 0.112 | 0.119 | 0.115 | 0.118 |
| Tensile strength (kg/cm$^2$) | ASTM412 | 4.8 | 4.7 | 4.6 | 4.3 |
| Elongation (%) | ASTM412 | 120 | 130 | 120 | 120 |
| Tear strength (kg/cm) | ASTM624 | 1.2 | 1.1 | 1.3 | 1.3 |
| Hardness (Shore A) | ASTM2240 | 5 | 4 | 5 | 5 |

In the above mentioned examples, 5, 10, 20 and 30 pph of blowing agents are used. To totally replace CFC-11 by HCFC123 and/or HCFC-141b, the ratios of HCFC-123 to HCFC-141b are 10/0, 7/3 and 5/5 respectively. In order to obtain a PU integral skin foam whose physical properties are comparable to those of traditional commercial product, the amount of chain extender, amine and organotin catalysts used in the formulation must be carefully adjusted.

Most surprisingly, the physical properties of polyurethane foam which uses HCFC-123 as blowing agent are superior to those of tradition PU foam which uses CFC-11 as blowing agent. HCFC-141b is unable to completely replace CFC-11 in the foaming of polyurethane. It must be combined with HCFC-123 in proportion of more than 5/5 to obtain a product which is not inferior than traditional CFC-11 foam. In all events, the process disclosed in the instant invention lessens the global pollution problem caused by ozone depletion and the greenhouse effect.

We claim:

1. A process for preparing polyurethane integral skin foam with low ozone depletion potential, which comprises mixing 100 pph of a polyether polyol, 5-50 pph of a chain extender, 0.1-2.0 pph of a surfactant, 0.01-0.20 pph of an amine and 0.01-0.20 pph of an organotin catalyst, 0-3.0 pph of a nucleating agent and 1.0-30 pph of a blowing agent comprising 50 to 100 weight percent of HCFC-123 (CHCl$_2$CF$_3$) and 50 to 0 weight percent of HCFC-141b (CH$_3$CFCL$_2$) to form a polyol mixture; blending said polyol mixture with isocyanate having an ISO index =0.95 to 1.10 and reacting said blend at a temperature from 0°-70° C. in a mold at a temperature of from 10 to 90° C. for a molding time of 1 to 9 minutes to form a polyurethane integral skin foam.

2. The process of claim 1 wherein the chain extender has a general formula as HO—R—OH, where $R=C_2-C_4$.

3. The process of claim 2 wherein the chain extender is ethylene glycol, propylene glycol, 1,4 butylene glycol, or diethylene glycol.

4. The process of claim 1 wherein the surfactant is a silicone glycol.

5. The process of claim 1 wherein the amine catalyst is dimethylethanol amine, triethylene amine, or triethylene diamine.

6. The process of claim 1 wherein the organotin catalyst is dibutyl tin dilaurate or stannous octoate.

7. The process of claim 1 wherein the nucleating agent is $SiO_2$ powder with a particle size $\leqq 30m\mu$.

8. The process of claim 1 wherein the isocyanate is a liquid comprising diisocyanate diphenyl methane.

9. The process of claim 1 wherein the mold temperature is in the range of 40°-60° C.

10. The process of claim 1 wherein the material temperature is in the range of 20°-50° C.

11. The process of claim 1 wherein the molding time is in the range of 3-7 minutes.

* * * * *